United States Patent [19]

Hamano et al.

[11] Patent Number: 4,846,021
[45] Date of Patent: Jul. 11, 1989

[54] SYSTEM FOR SHIFT CONTROL IN AUTOMATIC TRANSMISSION

[75] Inventors: Yukio Hamano, Kobe; Fumiaki Izumi, Toyota, both of Japan

[73] Assignee: Toyota Jidosha Kabushiki Kaisha, Aichi, Japan

[21] Appl. No.: 15,050

[22] Filed: Feb. 17, 1987

[30] Foreign Application Priority Data

Feb. 17, 1986 [JP] Japan ................................. 61-32430

[51] Int. Cl.⁴ ............................................. B60K 41/10
[52] U.S. Cl. ........................................ 74/866; 74/867
[58] Field of Search ............... 74/866, 867, 868, 869, 74/856

[56] References Cited

U.S. PATENT DOCUMENTS

| 3,738,199 | 6/1973 | Kubo et al. | 74/869 |
| 3,823,621 | 7/1974 | Kubo et al. | 74/869 X |
| 4,079,638 | 3/1978 | Sibeud | 74/866 |
| 4,228,700 | 10/1980 | Espenschied et al. | 74/866 |
| 4,393,732 | 7/1983 | Suzuki et al. | 74/866 |
| 4,494,423 | 1/1985 | McCarthy et al. | 74/867 X |
| 4,502,354 | 3/1985 | Suzuki et al. | 74/867 X |
| 4,503,734 | 3/1985 | Acker | 74/866 |
| 4,586,403 | 5/1986 | Lee et al. | 74/866 |
| 4,628,772 | 12/1986 | Nishikawa et al. | 74/868 X |
| 4,653,350 | 3/1987 | Downs et al. | 74/866 X |
| 4,744,031 | 5/1988 | Takeda et al. | 74/866 |
| 4,785,689 | 11/1988 | Iwatsuki et al. | 74/866 |

FOREIGN PATENT DOCUMENTS

| 0130812 | 1/1985 | European Pat. Off. | 74/866 |
| 0180149 | 10/1984 | Japan | 74/867 |

Primary Examiner—Leslie A. Braun
Assistant Examiner—Harold F. Macris
Attorney, Agent, or Firm—Oliff & Berridge

[57] ABSTRACT

In a system for shift control in an automatic transmission, wherein a hydraulic control device is operated to selectively switch the engagements of frictionally engaging devices and any one of plurality of gear stages can be achieved in accordance with a preset shift map, a system is provided to judge whether shifting is abnormal or not. When it is judged that the shifting is abnormal, oil pressure for engaging the frictionally engaging devices is raised. With this arrangement, the durability of the frictionally engaging devices can be secured.

5 Claims, 10 Drawing Sheets

| SHIFT POSITION | WORKING ELEMENT GEAR | SOLENOID $S_1$ | SOLENOID $S_2$ | $C_0$ | $C_1$ | $C_2$ | $B_0$ | $B_1$ | $B_2$ | $B_3$ |
|---|---|---|---|---|---|---|---|---|---|---|
| P | PARK | × | × | ○ | | | | | | |
| R | REV | × | × | ○ | | | | | | ○ |
| N | NEU | × | × | ○ | | | | | | |
| Ⓓ | 1st | ○ | × | ○ | ○ | | | | | |
| | 2nd | ○ | ○ | ○ | ○ | | | | ○ | |
| | 3rd | × | ○ | ○ | ○ | ○ | | | ○ | |
| | OD | × | × | | ○ | ○ | ○ | | ○ | |
| Ⓢ | 1st | ○ | × | ○ | ○ | | | | | |
| | 2nd | ○ | ○ | ○ | ○ | | | ○ | ○ | |
| | 3rd | × | ○ | ○ | ○ | ○ | | | ○ | |
| L | 1st | ○ | × | ○ | ○ | | | | | ○ |
| | 2nd | ○ | ○ | ○ | ○ | | | ○ | ○ | |

SYSTEM FOR SHIFT CONTROL IN AUTOMATIC TRANSMISSION

BACKGROUND OF THE INVENTION

This invention relates to a system for shift control in automatic transmission, and particularly to improvements in a system for shift control in automatic transmission, wherein the durability of frictionally engaging devices can be secured by a so-called failsafe function.

Automatic transmissions comprising gear transmission mechanisms, a plurality of frictionally engaging devices, and hydraulic pressure control devices operated to selectively switch the engagements of the frictionally engaging devices, so that any one of plurality of gear stages can be achieved in accordance with a preset shift map, are well known in the transmission art.

Furthermore, in an automatic transmission for a vehicle, of the type described, various systems are known for integrally controlling an automatic transmission and an engine, wherein engine torque is changed during shifting to obtain satisfactory shift characteristics and durability of the frictionally engaging devices (For example, Japanese Patent Laid-Open No. 69738/1980). More specifically, the system for integrally controlling the automatic transmission and the engine of the type described changes the amount of torque transmitted from the engine during shifting and controls the amount of energy absorbed by various members in the automatic transmission or by the frictionally engaging devices so as to complete a shifting within a short period of time under a low shift shock, whereby a satisfactory shift feeling is given to a driver and durability of the frictionally engaging devices is improved.

However, when the control for changing engine torque cannot be carried out due to trouble in a sensor system or a request from the engine side, durability of the frictionally engaging devices is reduced due to an increase in the amount of energy absorbed by the frictionally engaging devices in the automatic transmission. Moreover, shifting time duration is prolonged thereby worsening the shift feeling. This is caused by the shift tuning data (oil pressure and the like) in the automatic transmission set in expectation of a decrease in the engine torque by a predetermined value during the shifting.

Furthermore, no matter whether or not the engine torque change control during shifting as described above may be carried out, when the working oil pressure is decreased due to the oil leakage for example, the shift time duration is also prolonged to affect less durability of the frictionally engaging devices, and the shifting is not completed in a shockless region of the accumulator, whereby high shift shocks occur.

SUMMARY OF THE INVENTION

The present invention has been developed to obviate the above-described disadvantages of the prior art and has as its object the provision of a shift control system in an automatic transmission, wherein, when an abnormal shifting is performed (or to be performed) for some reason or other, the abnormal shifting is quickly detected, so that the durability of the frictionally engaging devices in the automatic transmission can be secured, and satisfactory shift characteristics can be secured.

As shown in FIG. 1, according to the present invention, in the case where an abnormal shifting actually occurs with no engine torque change control being carried out for some reason such as a trouble in the sensor system or a request from the side of the engine, in which case an engine torque change control should be carried out, or, in the case where an abnormal shifting actually occurs for some reason such as wear-out of the frictionally engaging devices or lowered working oil pressure, the abnormal shifting is quickly detected. When an abnormal shifting is detected, oil pressure for engaging the frictionally engaging devices is raised. As a result, even if the engine torque change control, which should have been carried out, is not performed for some reason or other, the capacity of the frictionally engaging devices can be satisfactorily secured, so that the durability of the frictionally engaging devices is not impaired and the shifting can be completed within a shockless region of an accumulator, thus enabling to maintain the shift characteristics satisfactorily.

Even when an abnormal shifting is caused for some reason for example such as lowered working oil pressure caused by oil leakage and the like, the working oil pressure is raised to dissolve these causes, so that the abnormal shifting can be obviated.

Additionally, as means for raising the oil pressure to engage the frictionally engaging devices, it is possible to use means of prohibiting cutback of line pressure as will be described hereunder for example.

A preferred embodiment is of such an arrangement that means for judging the abnormality is the means which monitors an engine rotary speed and judges whether a time duration, during which the engine rotary speed changes is inappropriate or not in comparison with a preset value.

Another preferred embodiment is of such an arrangement that means for judging the abnormality is the means which monitors an output shaft torque of the automatic transmission and judges whether a time duration, during which the output shaft torque changes from the minimum value to the maximum value is inappropriate or not in comparison with a preset value.

A further preferred embodiment is of such an arrangement that means for judging the abnormality is the means which monitors an output shaft torque of the automatic transmission and judges whether the maximum value or the minimum value of the output shaft torque is inappropriate or not in comparison with a preset value.

As described above, according to the present invention, the means for judging the abnormality need not necessarily be limited. Additionally, in this case, it would be better if the preset value in each of the means is changed in accordance with the engine load, the type of shifting and the like.

Preferably, the means for judging the abnormality is the means for judging the presence of an abnormal shifting only when a predetermined number of shiftings differing from the normal shiftings are continuously judged. With this arrangement, the abnormality can be judged without fail.

Preferably, when the oil pressure is raised, a warning is issued. With this arrangement, the driver can be quickly informed of an occurrence of an abnormal shifting for some reason or other.

Preferably, rise in the oil pressure is performed only for the shifting time or for a period of time including the shifting time. The following is the advantage achieved with this arrangement. Namely, during the steady time (non-shifting time), it is necessary to hold a value of oil pressure as high as a predetermined frictionally engaging devices can be maintained in the engaged state, whereby a considerably high safety factor in design is taken, so that slightly lowered oil pressure does not matter. However, during the shifting transition time, it is necessary to hold a value of oil pressure as high as the frictionally engaging devices can move from the non-engaged state to the engaged state while absorbing the driving torque and inertia torque of the engine. Furthermore, from the view point of the shift shock, the high oil pressure beyond necessity is considered problematical. Accordingly, in general, the latter value of oil pressure is regulated very accurately and an adverse influence due to the lowered oil pressure would be high. As a consequence, control of raising the oil pressure can be performed without much trouble even if such control is performed only for the shifting transition time or for a time duration including the shifting transition time. In contrast thereto, during the steady time (not-shifting time), there are cases where it would be better to decrease wasteful power loss by not performing the control of raising the oil pressure.

Preferably, rise in the oil pressure is performed only with the type of shifting which has had an abnormality. With this arrangement, no rise in the oil pressure can be carried out with a shifting having no problem in particular, wasteful power loss can be avoided, and increased shift shocks due to the rise in the oil pressure can be avoided. Additionally, it is well known that, when the working oil pressure is raised, the durability of the frictionally engaging devices is improved, however, the shift shocks tend to be high.

Preferably, rise in the oil pressure is carried out only when an engine load is higher than a predetermined value. This is because the durability of the frictionally engaging devices does not matter when the engine load is low.

Additionally, according to the present invention, the oil pressure may be raised immediately after a shifting is detected as abnormal (while the abnormal shifting is still under way), or the oil pressure may be raised for the succeeding shifting.

BRIEF DESCRIPTION OF THE DRAWINGS

The above object, features and advantages of the present invention, as well as other objects and advantages thereof, will become more apparent from the description of the invention which follows, taken into conjunction with the accompanying drawings, wherein like reference characters designate the same or similar parts and wherein.

DESCRIPTION OF THE PREFERRED EMBODIMENTS

The present invention will be described in detail with reference to the accompanying drawings which illustrate preferred embodiments of the present invention.

Figure 1:
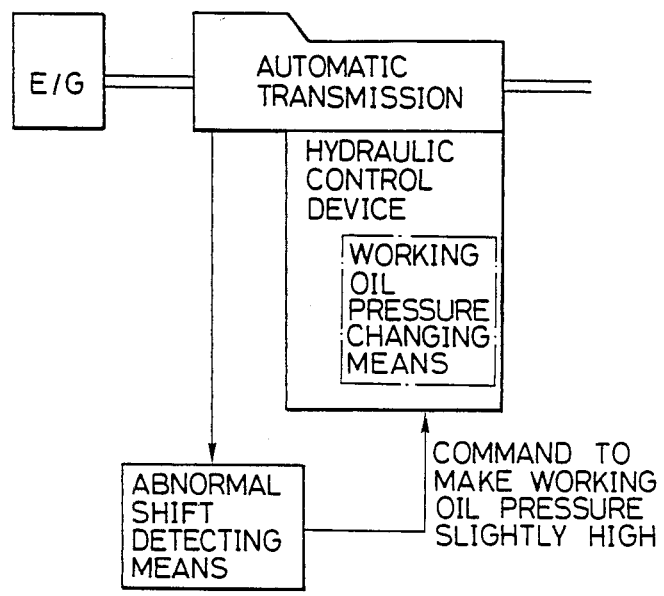
FIG. 1 is a block diagram showing the technical illustration of the present invention.
Figure 2:
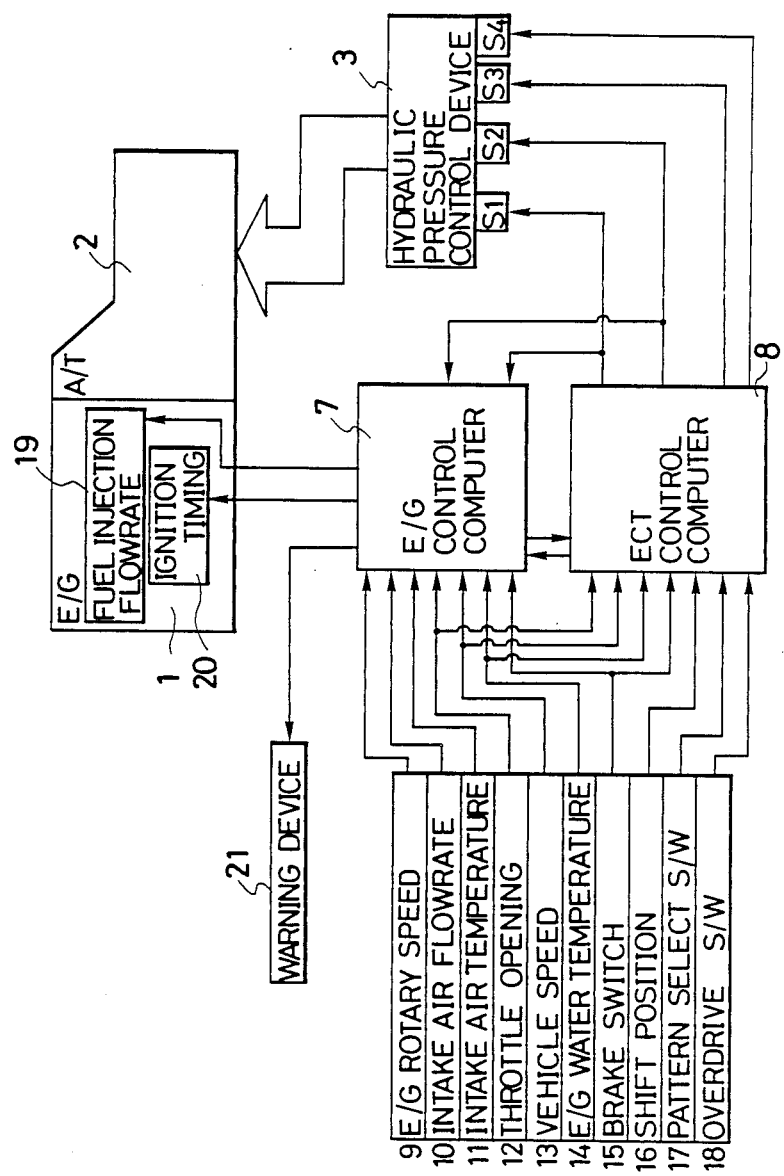
FIG. 2 is a general block diagram showing the arrangement of embodiment of the shift control system in an automatic transmission according to the present invention.

FIG. 2 is a block diagram showing the general arrangement of the system for integrally controlling an automatic transmission and an engine, to which the present invention is applied.

An engine 1 and an automatic transmission 2 are well known in the art. Fuel injection flowrate at an injector 19 and an ignition timing at a distributor 20 are controlled by an engine control computer 7, so that engine output in proportion to accelerator opening and engine rotary speed can be obtained. In the automatic transmission (hereinafter referred to as "ECT") 2, electromagnetic valves S1–S4 are controlled by an automatic transmission control computer (hereinafter referred to as "ECT control computer") 8, and oil lines in a hydraulic pressure control device 3 are controlled whereby the engagements of frictionally engaging devices are selectively changed, so that a gear stage proportional to vehicle speed and accelerator opening can be obtained.

More specifically, the engine control computer 7 receives signals of engine rotary speed from an engine rotary speed sensor (crank angle sensor) 9: intake air flowrate from an air flow meter 10; intake air temperature from an intake air temperature sensor 11; throttle opening from a throttle sensor 12; vehicle speed from a output shaft speed sensor 13; engine water temperature from a water temperature sensor 14; and brake-ON signal from a brake switch 15. The engine control computer 7 determines the fuel injection flowrate and the ignition timing in response to the above-mentioned signals. Furthermore, ON-OFF solenoid signals of electromagnetic valves S1–S2 controlled by the ECT control computer 8 are parallelly inputted into engine control computer 7, whereby shift timing of the automatic transmission is recognized.

ECT control computer 8 receives signals from the throttle sensor 12; the vehicle speed sensor 13; the water temperature sensor 14; the brake switch 15, and further, signals of: position of a shift lever from a shift position sensor 16; running selection patern such as a fuel consumption mode and a power performance mode from a pattern select switch 17; permission of a shift to overdrive from an overdrive switch 18; and the like, whereby the ON-OFF states of electromagnetic valves S1–S4 are controlled, so that a gear stage proportioned to the vehicle speed and the accelerator opening can be obtained. Additionally, the electromagnetic valve S3 is used for engaging a lockup clutch and the electromagnetic valve S4 is used for non-acting of cutback as will be described hereunder.

Figures 3, 4:
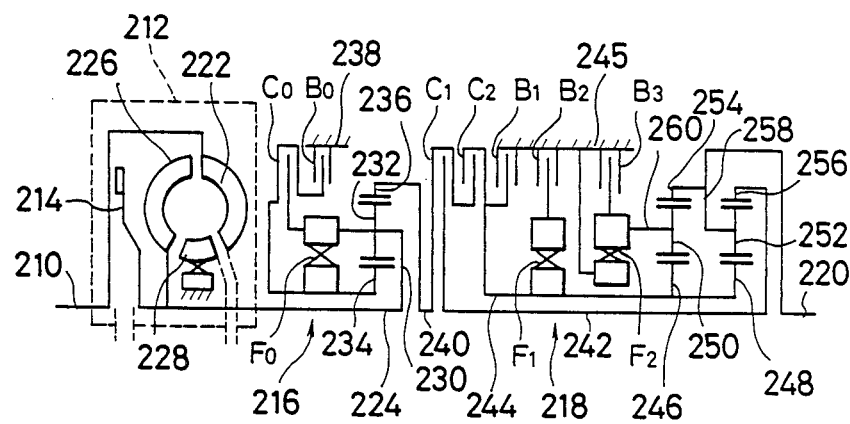
FIG. 3 is a skeleton diagram showing the transmission section of the automatic transmission in the above embodiment.
FIG. 4 is a chart showing the operating positions of the frictionally engaging devices.

FIG. 3 is the skeleton diagram showing the transmission section of the automatic transmission.

The driving force inputted into an input shaft 210 is passed through a torque converter 212 or a lockup clutch 214 provided in the torque converter 212, an overdrive mechanism 216 and a planetary gear type transmission device 218 as a gear mechanism of three forward gear stages and one reverse gear stage, and transmitted to an output shaft 220. The torque converter 212 is well known and includes a pump 222 rotatable with the input shaft 210, a turbine 226 fixed to a turbine shaft 224 for transmitting the driving force to the overdrive mechanism 216 and a stator 228 fixed to the torque converter 212 through a one-way clutch. The turbine shaft 224 constitutes an input shaft of the overdrive mechanism 216 and connected to a carrier 230 of the planetary gear unit in the overdrive mechanism 216. A planetary pinion 232 is rotatably supported by the carrier 230 and in mesh with a sun gear 234 and a ring gear 236. A clutch C0 and a one-way clutch F0 are provided between the sun gear 234 and the carrier 230. A brake B0 is provided between the sun gear 234 and a housing 238 of the overdrive mechanism 216. The ring gear 238 of the overdrive mechanism 216 is fixed to an input shaft 240 of the planerary gear type transmission device 218, and a clutch C1 provided between the input shaft 240 and an intermediate shaft 242. A clutch C2 is provided between the input shaft 240 and a sleeve shaft 244 coupled to the intermediate shaft 242. A brake B1, a brake B2 and a one-way clutch F1 are provided between the sleeve shaft 244 and a housing 245 of the transmission. Sun gears 246 and 248 fixed to the sleeve shaft 244 are brought into mesh with ring gears 254 and 256 through planetary pinions 250 and 252, to thereby form two sets of planetary gear units. One of the ring gears 256 is fixed to the intermediate shaft 242. A carrier 258 rotatably supporting the planetary pinion 252 is connected to an output shaft 220 and the other of the ring gears 254. A brake B3 and a one-way clutch F2 are respectively provided between a carrier 260 rotatably supporting the other 250 of the planetary pinions and the transmission housing 245.

The aforesaid clutches C0, C1 and C2 and the aforesaid brakes B0, B1, B2 and B3, being the frictionally engaging devices are selectively driven be actuators C0y, C1y, C2y and C2y' and B0y, B1y, B2y and B3y, which are operated by the hydraulic control device 3, whereby specified frictionally engaging devices of the planetary gear type transmission device 218 are subjected to braking or engaged with one another, so that gear stages can be switched as shown in FIG. 4. In FIG. 4, marks O indicate the actuated positions.

Figure 5:
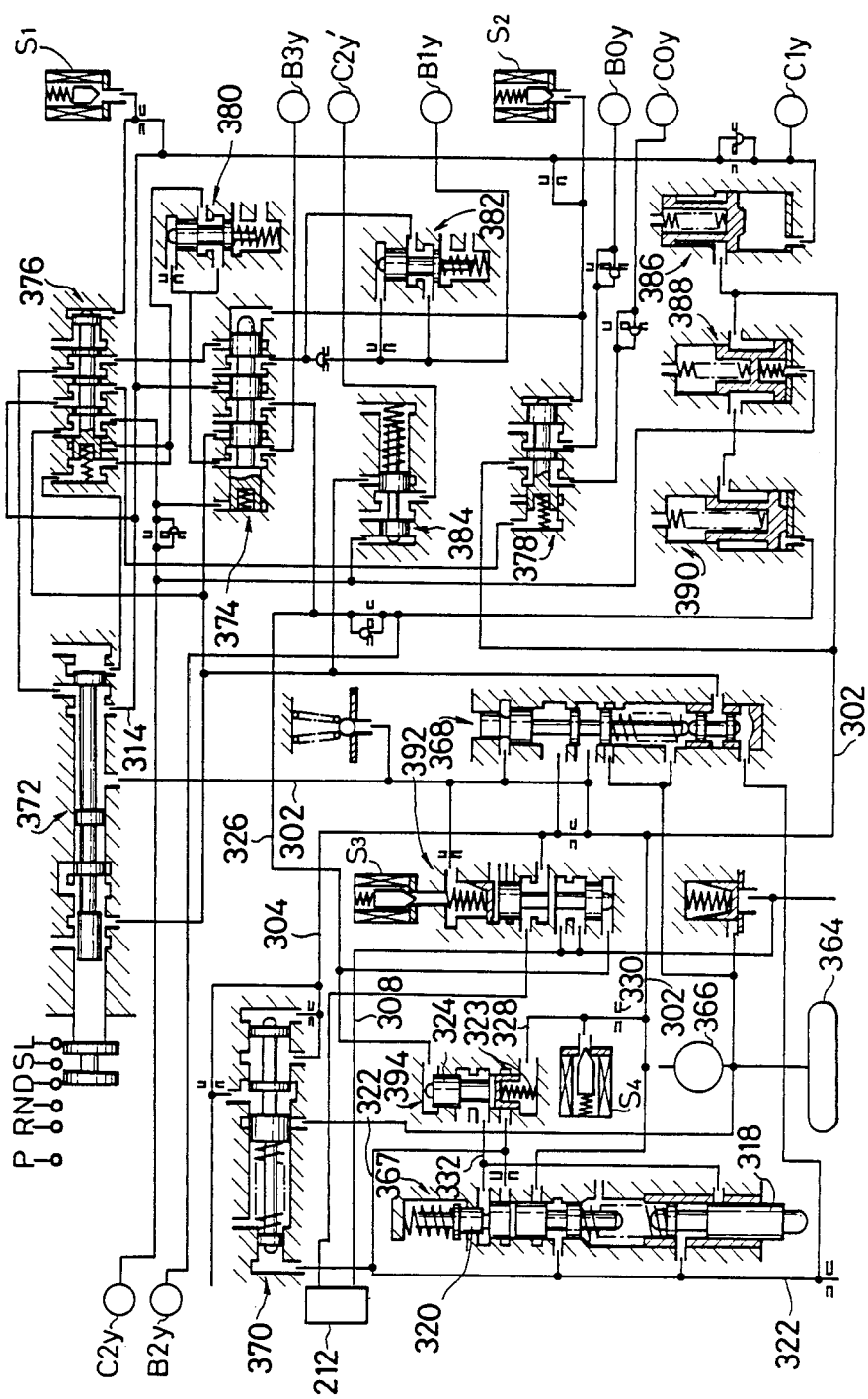
FIG. 5 is a generally outlined hydraulic circuit diagram showing the hydraulic control device.

FIG. 5 shows the hydraulic control device 3 in detail.

This hydraulic control device 3 includes: an oil pump 366 for feeding oil in an oil reservoir 364 under pressure; a throttle valve 367; a primary regulator valve 368; a secondary regulator valve 370; a manual control valve 372 operated by a shift lever provided in a driver's seat; a 1-2 shift valve 374; a 2-3 shift valve 376; a 3-4 shift valve 378; a low coast modulator valve 380 for regulating feed of working oil pressure to the actuator B3y; an intermediate coast modulator valve 382 for regulating feed of working oil pressure to the actuator B1y; a reverse clutch sequence valve 384; accumulators 386 and 388 for smoothing engagement between the clutches C1 and C2; an accumulator 390 for smoothing engagement of the brake B2; a lockup control valve 392 for operating the lockup clutch 214; a cutback valve 394 for lowering the line oil pressure in accordance with the increase of the vehicle speed; the electromagnetic valve S1 for controlling the 2-3 shift valve 376, which is operated by a shift control circuit, not shown; the electromagnetic valve S2 for controlling the 1-2 shift valve 374 and the 3-4 shift valve 378; the electromagnetic valve S3 for controlling the lockup control valve 392; the electromagnetic valve S4 for bringing the cutback into non-acting state; oil lines for connecting the valves and the actuators to one another; and the like.

The working oil fed under pressure from the oil pump 366 is regulated to the line oil pressure by the primary regulator valve 368, passed through an oil line 302, and fed to the manual control valve 372 through an oil line 304. The secondary regulator valve 370 regulates torque conveter oil pressure and lubricant oil pressure in response to a throttle pressure and the line oil pressure.

The throttle valve 367 includes: a first spool 318 movable in accordance with a value of depression of an accelerator pedal; and a second spool 320 receiving a biasing force commensurate to the movement of the first spool 318 through a spring. The second spool 320 is urged toward the first spool 318 through another spring.

Figure 6:
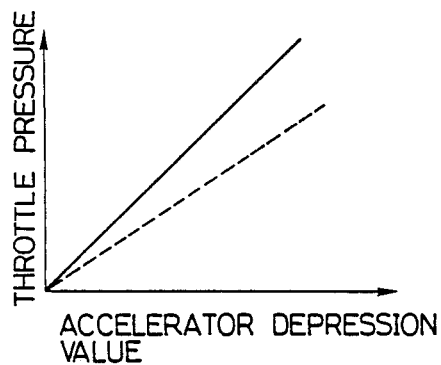
FIG. 6 is a chart showing the relationship between the value of depression of an accelerator and a throttle pressure.
Figure 7:
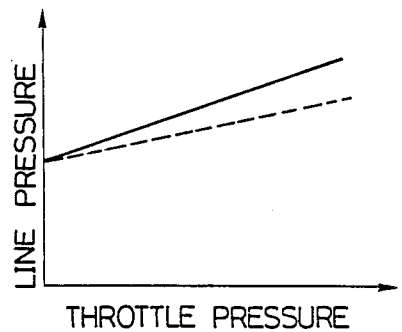
FIGS. 7 is a chart showing the relationship between the throttle pressure and the line oil pressure.

This throttle valve 367 feeds the throttle pressure substantially in proportion to the value of depression of the accelerator pedal to the primary regulator valve 368 and the secondary regulator valve 370 through an oil line 322, and raises the line oil pressure and the torque converter oil pressure in accordance with the value of depression of the accelerator pedal. More specifically, the throttle pressure outputted from the throttle valve 367 is raised in accordance with the valve of depression of the accelerator pedal as indicated by a solid line in FIG. 6, and the line oil pressure outputted from the primary regulator valve 368 is raised in accordance with the throttle pressure, i.e. the value of depression of the accelerator pedal as indicated by a solid line in FIG. 7.

The cutback valve 394 has a spool 324 urged toward a cutback non-acting position by a spring 323. When the electromagnetic valve S2 is energized to bring the 1-2 shift valve 374 into second gear stage or thereabove, the line oil pressure is caused to act on this spool 324 through an oil line 314, the 1-2 shift valve 374 and an oil line 326, whereby the spool 324 is moved to a cutback acting position against the resiliency of the spring 323. Furthermore, this cutback valve 394 is connected to an oil line 302 through an oil line 328 and an orifice 330, and the electromagnetic valve S4 is connected to the oil line 328. When the electromagnetic valve S4 is deenergized and a valve port thereof is closed, the line oil pressure of the oil line 302 is caused to act on the spool 324, whereby the spool 324 is located at a cutback non-acting position (position shown in FIG. 5). When the electromagnetic valve S4 is energized and a valve port thereof is opened, pressure oil in the oil line 328 is discharged and the spool 324 is allowed to move into a cutback acting position.

When the spool 324 is located at the cutback non-acting position, the throttle pressure fed through the oil line 322 is not supplied to the second spool 320 of the throttle valve 367. However, when the spool 324 is located at the cutback acting position, the throttle pressure as being cutback pressure is fed to the second spool 320 through the oil line 332. On the other hand, the second spool 320 of the throttle valve 357 is formed with a pressure receiving surface. When the pressure receiving surface receives the cutback pressure fed from the cutback valve 394 through the oil line 332, a force acts on the side of first spool 318. As a consequence, when the spool 324 of the cutback valve 394 is located at the cutback acting position, the throttle pressure and the line oil pressure are changed to the pressures indicated by broken lines in FIGS. 6 and 7. After all, the cutback valve 394 is constructed such that, in the case of first gear stage, the line oil pressure is raised to hold the high capacity of the frictionally engaging devices such as clutches and brakes, and, in the case of second gear stage or thereabove, the line oil pressure is lowered to avoid unnecessary power loss due to the oil pump 364.

Figure 8:
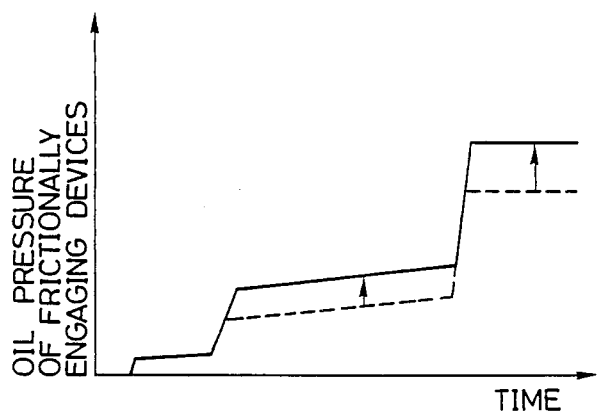
FIG. 8 is a chart showing oil pressure fed to the frictionally engaging devices along the time axis.

In this embodiment, the electromagnetic valve S4 is turned off when an abnormal shifting is detected, whereby the cutback valve 394 is forcedly located at the cutback non-acting position, so that the cutback action as described above is not carried out, thereby raising the oil pressure in the frictionally engaging devices (In FIG. 8, from broken line to solid line).

Figure 9A:
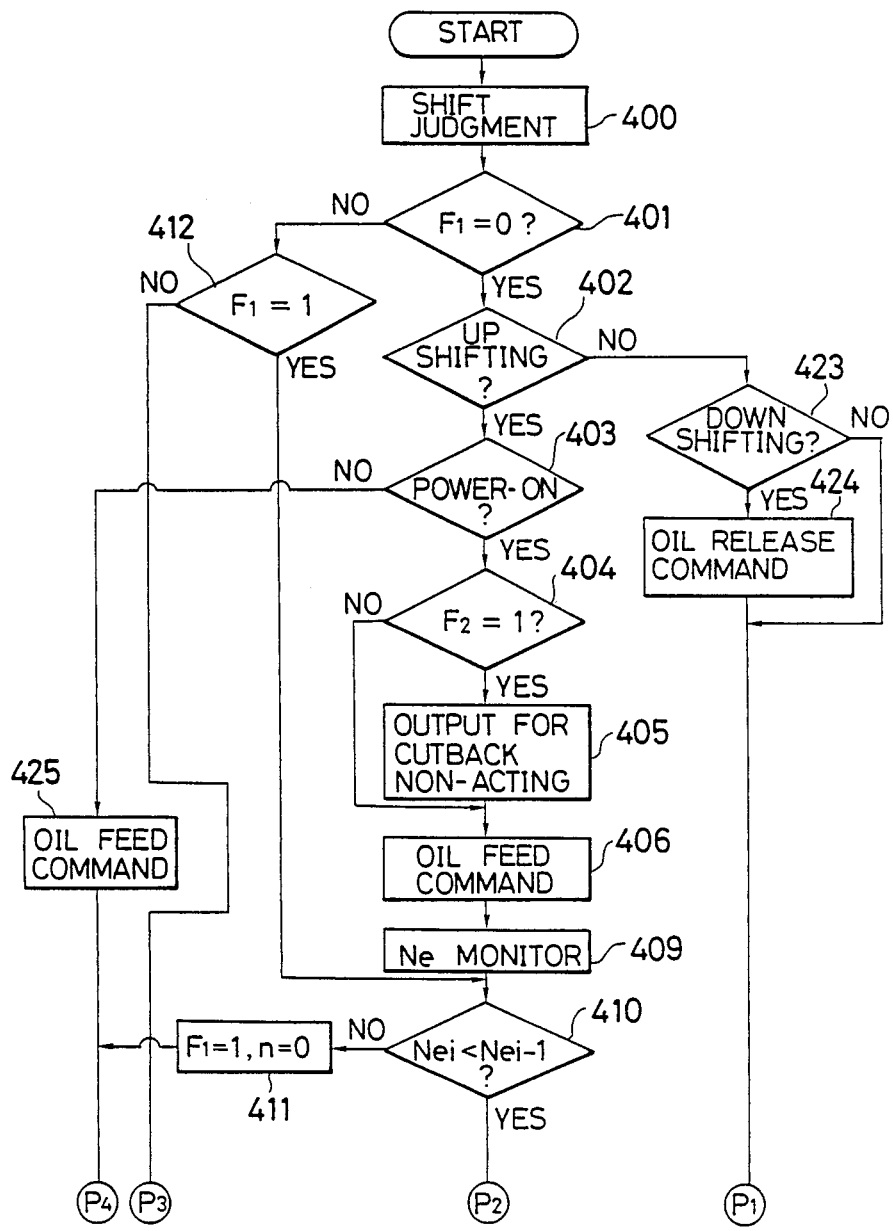
FIGS. 9A and 9B show a flow chart showing a control routine adopted in the device of the above embodiment.
Figure 9B:
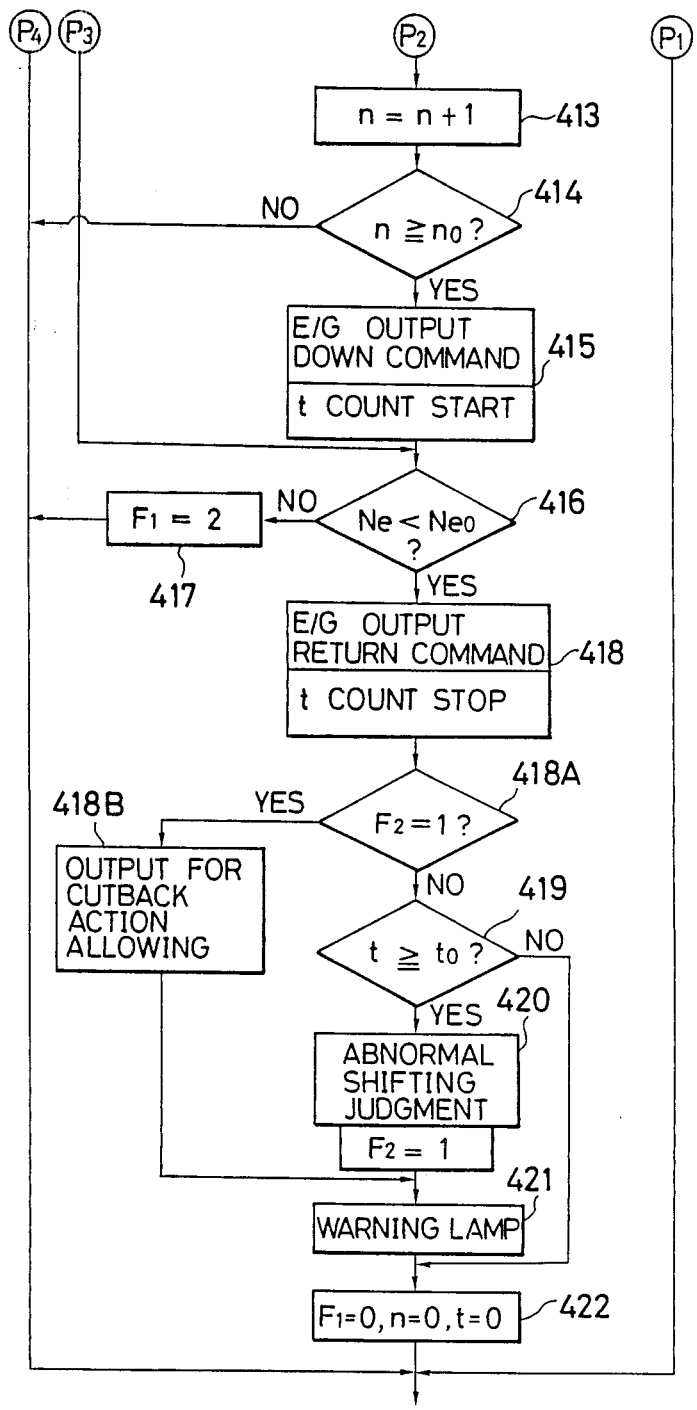

FIG. 9 is a flow chart illustrating the integral control of the engine and the automatic transmission.

In this embodiment, the engine rotary speed Ne is monitored and a time duration, during which the engine rotary speed Ne is lowered, is detected, so that the presence of an abnormal shifting can be judged.

Steps will hereunder be described.

Step 400: a shift judgment is performed in accordance with the vehicle speed, the throttle opening and the like.

Step 401: judgment is made as to whether a flag F1 is zero or not. The flag F1 is a flag for controlling the progress of a logic flow. Since the flag F1 is set at zero initially, the routine proceeds to Step 402.

Steps 402 and 403: judgment is made as to whether the shifting is an up shifting or not, and whether it is power-ON (i.e., whether the vehicle is being driven by the engine); or not (i.e., whether the inertia of the vehicle is driving the engine, for example, when the accelerator pedal is not depressed). In this embodiment, the control of raising of the oil pressure is carried out only in the case of power-ON and up shifting (i.e., during up shifting when the vehicle is being driven by the engine). When it is judged that there is no up shifting in Step 402, the routine proceeds to Step 423, where judgment is made as to whether a down shifting is present or not. When there is a down shifting, an oil pressure release command is outputted to the specific frictionally engaging devices in Step 424.

Step 404: judgment is made as to whether a flag F2 is 1 or not. The flag F2 is set to 1 when the presence of an abnormal shifting is judged in Step 420. When F2=1, i.e. an abnormal shifting actually occurs, the routine proceeds to Step 405, where the electromagnetic valve S4 is turned off to bring the cutback into non-acting state.

Step 406: commands (shift commands) are outputted to the electromagnetic valves S1 and S2 so as to feed oil pressure to the specific frictionally engaging devices.

Step 409: the engine rotary speed Ne is monitored to detect an actual shift starting time in response to an upshift command.

Step 410: judgment is made as to whether or not the detected engine rotary speed Nei is lower than the preceding detected value Nei-1. Namely, judgment is made as to whether or not the engine rotary speed Ne has begun to be lowered by the upshift command. In this case, even if the oil pressure fed to the frictionally engaging devices for the up shifting is started in Step 406, normally, the shifting is not immediately started. Accordingly, in Step 410, the routine initially indicates "NO", and preceeds to Step 411.

Step 411: after an oil pressure feed command for the upshift is issued, in order to indicate the start of monitoring of the engine rotary speed Ne, flag F1 is set at 1, and a number n of establishments of $Nei<Nei-1$ is set at zero.

Step 413: when $Nei<Nei-1$ is established in Step 110, 1 is added to the number n of the establishments.

Step 414: judgment is made as to whether the number n of continuous establishments of $Nei<Nei-1$ is equal to or more than a predetermined value n0 (n0=3, for example) or not. When the result of judgment is "YES", it is descriminated that the lowered engine rotary speed is not temporary in the fluctuations of rotation but is the lowered rotation (change) in response to the upshift command. As a result, the actual shift start is recognized and the routine preceeds to Step 415.

Step 415: an engine output lowering command is outputted, and simultaneously, a timer is started to measure shift time duration t.

Step 416: Ne being monitored is compared with Ne0 which is set to be slightly higher than a calculated value corresponding to a typical Ne value after shifting. When not $Ne<Ne0$, it is judged that the shifting is still underway (engine output down), and the routine proceeds to Step 417. When $Ne<Ne0$ is established, it is judged that it is immediately before the completion of the shifting, and the routine proceeds to Step 418.

Step 417: in order to indicate that the shifting is still underway, flag F1 is set at 2.

Step 412: since it was judged that F1=0 in Step 405 judgment is made as to whether or not F1=1 in this Step. When F1=1, the routine proceeds to Step 410 to judge whether or not a shifting is started. When F1 is not 1, i.e. F1=2, the routine proceeds to Step 416 to judge whether or not the shifting is completed.

Step 418: since it is immediately before the completion of the shifting, a command to restore the engine output is outputted and the timer for measuring the shift time duration t is stopped.

Step 418A: judgment is made as to whether the flag F2 is 1 or not. When F2=1, the cutback is maintained in non-acting state by Step 405. In order to restore it, the routine proceeds to Step 418B, where the cutback valve 394 is brought into cutback acting allowed state, and thereafter, the routine proceeds to Step 421.

Step 419: shift time duration t is compared with an abnormal shifting discrimination time duration t0 preset by a type of shifting, a throttle opening and a shift point. When $t \geq t0$, the routine proceeds to Step 420.

Step 420: it is judged that an abnormal shifting has taken place, and the flag F2 is set to 1.

Step 421: a display of a warning lamp is made to inform the driver that the line oil pressure is raised (cutback non-acting) for the purpose of protecting the frictionally engaging devices due to the occurrence of an abnormal shifting.

Step 422: the flag F1, the number n of establishments of $Nei<Nei-1$ and the shift time duration measured value t are all set to zero.

Step 423: judgment is made as to whether there is a down shift or not. When "YES", the routine proceeds to Step 424.

Step 424: oil pressure release commands are outputted to the specific frictionally engaging devices.

Step 425: oil pressure feed commands are outputted to the specific frictionally engaging devices.

Additionally, reset of the flag F2 is not shown in the flow chart. However, the reset should not be made unless the cause of the abnormal shifting is dissolved, e.g. the reset should be made when a terminal of a battery is OFF (released).

According to this embodiment, when an abnormal shifting is detected, oil pressure is raised only succeeding shifting time, so that the durability of the frictionally engaging devices can be secured and the power loss during non-shifting time can be avoided.

Figure 10A:
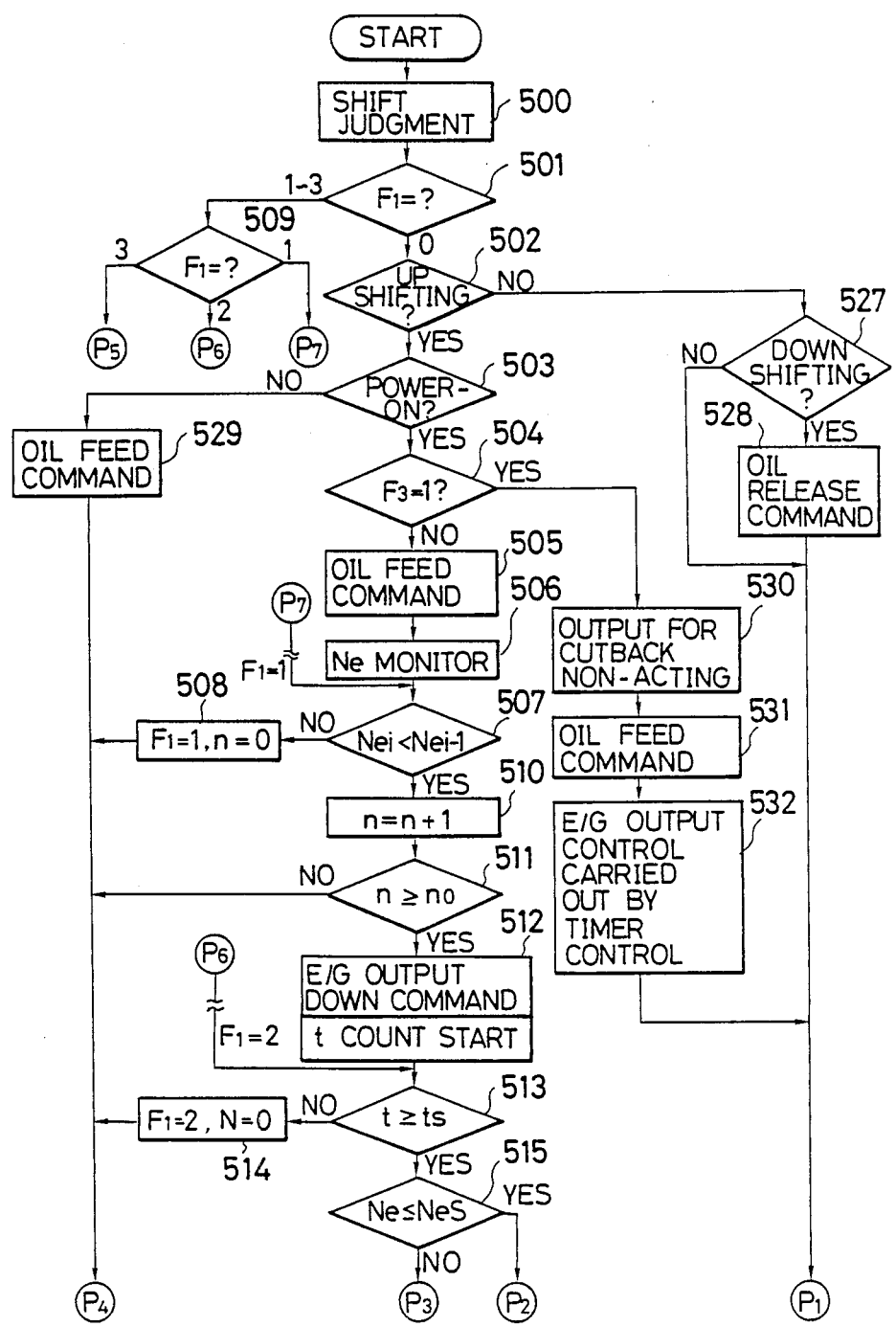
FIGS. 10A and 10B show a flow chart showing another control routine.
Figure 10B:
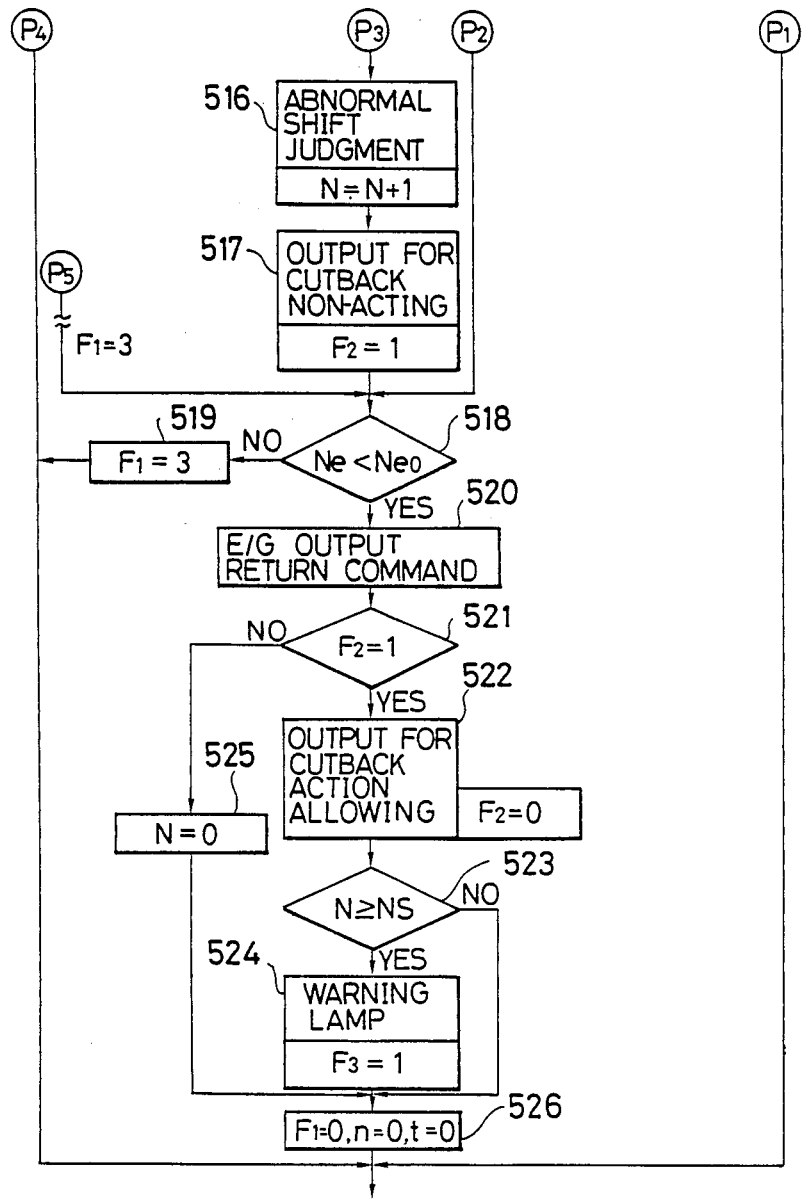

FIG. 10 shows an example of another control flow. In this control flow, when an abnormal shifting is detected, oil pressure is raised within this shifting.

Steps will hereunder be described in detail.

Step 500: a shift judgment is performed.

Step 501: the flag F1 is a sign to command the place, to which the flow should jump. Initially, F1=0.

Step 502: to be performed only with an up shift.

Step 503: to be performed only with power-ON (when the vehicle is being driven by the engine).

Step 504: a flag F3 descriminates whether abnormal shifts during shifting are continuously judged a predetermined number of times or more, and a fail warning lamp is turned on or not.

Step 530–532: when F3=1, the routine proceeds to Step 530, where oil pressure is fixed to the higher side and engine output control is carried out by timer control. Thus, even when engine output lowering by the detection of the engine rotary speed Ne in main flow cannot be carried out due to failure in detecting trouble in an Ne sensor and the like, engine output lowering is carried out by the timer control (which is unavoidably slightly inaccurate though) so that the energy absorbed value of the frictionally engaging devices can be decreased even by a small value. However, when engine out-put lowering control cannot be carried out for a reason such as disconnection of an output down signal, Step 532 becomes meaningless.

Step 505: When F3 is not 1 (when the fail warning lamp is not turned on), oil pressure on the normal level is fed to the frictionally engaging devices.

Steps 506–512: this is a flow showing the timing of engine output down and similar to Steps 409–415 in the preceding embodiment.

Step 513: judgment is made as to whether or not the time duration t from the start of shifting has elapsed a predetermined time duration tS. The predetermined time duration tS is the time duration for judging whether a shifting is an abnormal shifting or not during shifting. When t is not equal to or not higher than LS, the routine proceeds to Step 514.

Step 515: judgment is made during shifting, as to whether a shifting is abnormal or not, depending upon whether $Ne<NeS$ is established or not immediately after $t\geq tS$ is established. Additionally, henceforth, the timer is not used, so that the timer can be stopped here. When Ne is not equal to or not lower than NeS, it is judged that the shifting has not progressed yet (the rate of change of Ne is low, i.e. the engine output lowering is not carried out or the value of the lowering is low), and the routine proceeds to Step 516. As for predetermined values of tS and NeS, preset examples thereof are shown FIG. 11.

Step 516: immediately after $t>tS$ is established, when Ne is not lower than NeS, the presence of an abnormal shifting during shifting is judged. Furthermore, the number of times of establishments is counted.

Step 517: the cutback is brought into non-acting state and oil pressure is switched to the higher side during shifting (the electromagnetic valve S4 is OFF). The flag F2 is set to 1 so as to show that the clutch capacity has been switched to the higher side during shifting.

Steps 518–520: the end of shifting is detected to complete the engine output control.

Steps 521 and 522: when F2=1, i.e. the cutback is in non-acting state, fixing of the cutback to non-acting state is released, the cutback is brought into cutback action allowed state in response to signal oil pressure of the oil line 326, and the flag F2 is set to zero. However, specifically, the release of the fixing of the cutback to non-acting state is carried out after the shifting is reliably completed (a predetermined time duration after the establishment of Step 518).

Step 523: judgment is made whether or not, a number of times N of switchings of oil pressure to the direction of raising due to the abnormal judgment during shifting is larger than a predetermined number of times NS.

This is because, when a number of times NS of abnormal shifts during shifting are continuously discriminated, the presence of an entire failure is concluded, the driver is informed of the presence of the entire failure by the fail warning lamp, and the control by the timer as described in the aforesaid Steps 530–532 is carried out.

Step 524: when $N\geq NS$, the fail warning lamp is turned on and the flag F3 is set to 1 so as to represent the failure. Reset of the flag F3 may be made when the batter terminal is OFF.

Step 525: in order to count the continuous number of times N, even when only one time of F2 is not 1, N is reset (N=0).

Figure 11:
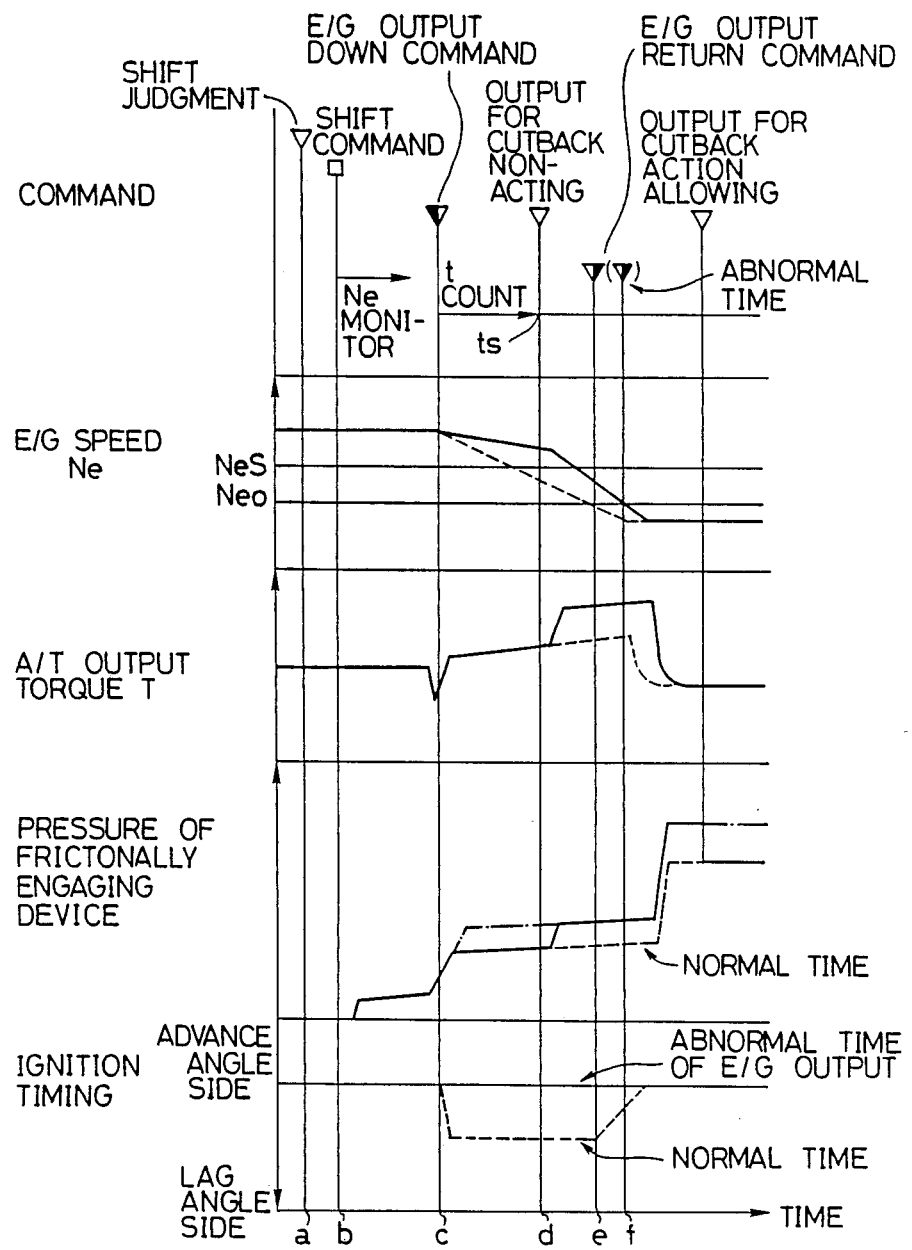
FIG. 11 is a shift transitional characteristics curve diagram when the control routine shown in FIG. 10 is carried out.

FIG. 11 shows the shift transitional characteristics when this control flow is carried out.

A shift command "b" is carried out a predetermined time duration after a shift judgment "a" as in the conventional manner. This is made so as to meet the situation when the so-called multi-speed shiftings are carried out.

An engine output down command is outputted at time "c" when a number of times n of continuous establishments of $Nei<Nei-1$ are detected by monitoring the engine rotary speed Ne.

In response to the engine output down command, t timer count is started, and, at time "d" when this count reaches tS, the engine rotary speed Ne is compared with the predetermined value NeS. When the presence of an abnormality shifting is judged in this comparison, a cutback non-acting command is outputted at this time, and henceforth, the working oil pressure in the frictionally engaging devices is raised, so that the durability of the frictionally engaging devices can be secured and the shift time duration is shortened to some extent. Finally, at the time when the shifting seems to be fully completed, a cutback acting allowing command is outputted, and the cutback is normally carried out.

Additionally, in FIG. 11, broken lines indicate the shift characteristics when the engine output control is normally carried out and solid lines indicate the shift characteristics when the engine output control is not carried out, which results in an occurrence of an abnormal shifting, and control of raising the oil pressure is carried out for the abnormal shifting.

According to this embodiment, an abnormal shifting is detected until the shifting finishes and a countermeasure of oil pressure raising is taken against the abnormal shifting, so that deteriorated durability of the frictionally engaging devices can be controlled to the minimum. When the aforesaid controls continuously occur NS times, the driver can be informed of the abnormality by the warning device, so that the driver can quickly inspect a cause of occurrence of a trouble. Furthermore, in this case, the engine output control by the timer is carried out, so that absorbed energy by the frictionally engaging devices can be decreased.

Additionally, according to the present invention, change in oil pressure may be limited to the type of shifting which has had the abnormality, or to the case of the large throttle opening which causes a problem to the durability of the frictionally engaging devices. Means for changing the oil pressure is not limited to the above embodiment. For example, an electromagnetic proportion valve may be used to optionally control the line pressure. Oil pressure control by use of the electromagnetic proportion valve is well known.

Furthermore, in the above embodiment, in judging the presence of an abnormal shifting, the engine rotary speed is monitored and the state where the engine rotary speed is lowered is observed. However, the present invention need not necessarily be limited to this, and the presence of the abnormal shifting may be judged such that, for example, an output shaft torque of the automatic transmission is monitored to make a judgment as to whether a time period, during which the output shaft torque changes from the minimum value to the maximum value, is longer than a preset value or not. Further, an output shaft torque of the automatic transmission is monitored to make a judgment as to whether the maximum value of the output shaft torque is larger than a preset value or not. In these cases, oil pressure raising is performed from the start of the succeeding shifting (Refer to a one-dot chain line in FIG. 11).

What is claimed is:

1. A system for integrally controlling an automatic transmission and an engine, wherein gear shifting mechanisms and a plurality of frictionally engaging devices are provided, a hydraulic control device is operated to selectively switch engagements of said frictionally engaging devices, and any one of a plurality of gear stages can be achieved in accordance with a preset shift map, and means for changing torque of said engine is provided, said torque of the engine is changed during said switching of the engagements of the frictionally engaging devices, the frictionally engaging devices being actuated by an increase of hydraulic pressure by an amount, said system comprising:
    means for judging whether or not said switching of the engagements deviates from a preset schedule due to failure of said engine torque change;
    means for raising said amount when said switching of engagements is judged to deviate from the preset schedule, said raising of the amount of hydraulic pressure is performed while said judged switching of the engagements itself is still performed.

2. A system for shift control as set forth in claim 1, further comprising:
    means for issuing a warning when said amount is raised.

3. A system for shift control as set forth in claim 15, further comprising:
    means for detecting shift transitional time;
    wherein the raising of said amount is carried out only for the shift transitional time.

4. A system for shift control as set forth in claim 1, further comprising;
    means for determining a predetermined time duration including a shift transitional time;
    wherein the raising of amount is carried out only for the predetermined time duration including the shift transitional time.

5. A system for shift control as set forth in claim 1, further comprising:
    means for detecting engine load:
    wherein the raising of said amount is carried out only when the engine load is larger than a predetermined value.

* * * * *